US008468063B2

(12) United States Patent
Danzan

(10) Patent No.: US 8,468,063 B2
(45) Date of Patent: *Jun. 18, 2013

(54) METHOD AND SYSTEM FOR DETERMINING MARKET DEMAND FOR BUYING AND SELLING PROPERTIES

(76) Inventor: Asaf Danzan, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,828

(22) Filed: Jul. 9, 2012

(65) Prior Publication Data

US 2012/0278128 A1  Nov. 1, 2012

Related U.S. Application Data

(63) Continuation-in-part of application No. 11/688,196, filed on Mar. 19, 2007, now Pat. No. 8,234,180.

(51) Int. Cl.
*G06Q 30/00* (2006.01)

(52) U.S. Cl.
USPC .......................................... 705/26.2; 705/26.1

(58) Field of Classification Search
USPC ............................... 705/26.1, 26.2, 26.3, 27.1
See application file for complete search history.

(56) References Cited

U.S. PATENT DOCUMENTS

| | | | |
|---|---|---|---|
| 5,664,115 A | 9/1997 | Fraser | |
| 6,594,633 B1 | 7/2003 | Broerman | |
| 6,684,196 B1 | 1/2004 | Mini | |
| 6,883,002 B2 | 4/2005 | Faudman | |
| 7,016,866 B1 | 3/2006 | Chin | |
| 7,133,835 B1 | 11/2006 | Fusz | |
| 7,146,343 B2 | 12/2006 | Donahue | |
| 2002/0091623 A1 | 7/2002 | Daniels | |
| 2003/0229552 A1 | 12/2003 | Lebaric | |
| 2006/0074792 A1 | 4/2006 | Wagoner | |

OTHER PUBLICATIONS

Blanton, K. "Online bidding offers new market for housing," McClatchy—Tribune Business News, (Jul. 3, 2006), pp. 1-1.*

* cited by examiner

*Primary Examiner* — Jeffrey A Smith
*Assistant Examiner* — Brandy A Zukanovich
(74) *Attorney, Agent, or Firm* — Mark Wisnosky

(57) ABSTRACT

A dynamic property buying and selling system is described. The system is comprised of networked hardware, software, processes and methods that enable an auction like system to probe the market and inform buyers, sellers and interested third parties of current market demand information including dynamics. The described system may be used in real estate and other markets to complete early stages of a negotiation process as well as enable buyers and sellers to test for market demand information. Third party observers may use the system to investigate and report on market demand information and test economic theories regarding the market of interest. An integrated expert system is useful to buyers, sellers and third party observers in providing answers to queries regarding correlation of auction parameters and optimization of parameters for particular desired outcomes.

12 Claims, 7 Drawing Sheets

METHOD AND SYSTEM FOR DETERMINING MARKET DEMAND FOR BUYING AND SELLING PROPERTIES

CROSS-REFERENCE TO RELATED APPLICATIONS

This application claims priority to and is a continuation in part of U.S. non-provisional application Ser. No. 11/688,196 with the amended title: A Method and System for Determining Market Demand for Buying and Selling Properties, filed Mar. 19, 2007, now U.S. Pat. No. 8,234,180 by the same inventor.

TECHNICAL FIELD

Embodiments of the invention relate to a system and process for buying and selling property.

BACKGROUND OF THE INVENTION

The traditional means for buying and selling property and in particular real estate in the United States is often through a formidable and archaic series of steps and documentation. The process is structured such that the real negotiation and optimization of the results for both buyers and sellers is lost in the often legally required paper mill. A more dynamic market has emerged for some categories of personal property and services through such services as e-bay®, ticketmaster®, Travelocity® and others. A problem with these on-line bidding processes is they typically do not enable dynamic two-way interactions between buyers and sellers and do not make use of the information generated by the buyer and seller interactions.

There have been numerous attempts to update the real-estate selling processes through placing the documents and transfer of documents into electronic on-line systems. But none have made use of the potential interactive nature of online purchasing to change and measure the dynamics of the process. Sellers are still represented by agents and presented offers from, in some cases, automatically pre-qualified buyers, and, buyers present offers, perhaps electronically but still using intrinsically the same paper based manual procedures. Neither party receives quick feedback on whether the market supports such an offer or whether this is the best deal that might be available to either party. The offers and acceptance process is typically a one step at a time process extending over hours or perhaps days.

Broerman (U.S. Pat. No. 6,594,633) and Mini (U.S. Pat. No. 6,684,196) describe real estate computer network that automates the paper process. The transaction includes the traditional offers and counter offers albeit now facilitated by an electronic transmission of the information. There have been a couple of attempts to create systems to automatically match sellers and qualified buyers. Fraser (U.S. Pat. No. 5,664,115) describes a system where a database of buyer information is matched against a database of seller qualification requirements and communicates those with minimum qualifying matches for their properties to the sellers. This would be similar to pre-qualifying for a real estate loan, adding that to a resume and selectively broadcasting the resume to the sellers. Chin (U.S. Pat. No. 7,016,866) adds weighted demographic criteria to the screening process to provide a score for a buyer indicative of a match to the sellers' ideal buyer. Although automating a paper process, the current systems do not take advantages of the dynamics and real time aspects offered by an electronically connected network. None of these systems provide a change to the dynamics of the process. None of these systems provide anything new to help buyers and sellers to optimize their choices based upon real time feedback of supply and demand for their property.

There is a need for a process to match buyers and sellers that gives buyers a chance to test dynamically their ability to negotiate an acceptable price on a property within a field of available properties including such factors as competing buyers. There is a need for a system and process for sellers to be able to assess demand for their property and properly set asking prices. There is a need for a system and process to provide real time market demand information for properties that is measured and updated on a time scale consistent with the factors affecting the market rather than dictated by the time scale required for manual transaction methods.

SUMMARY OF THE INVENTION

A networked computer system and a process for enabling early and fast first transactional steps to support the buying and selling properties are described. The system allows sellers to test the demand for their property. When demand is sufficient as indicated by acceptable pricing, multiple buyers and high activity or many offers, sellers may intervene and directly contact promising buyers to consummate the transaction. The system enables buyers to test the market place for affordability of specific properties or even groups of properties. Bidding is defined here as stating an interest in a posted property. In one embodiment bidding is similar to that in an auction in another embodiment bidding means stating an interest in a property at a given price. Bidding can be any of an auction bid, a written offer, be it electronic, paper or otherwise or a verbal offer. The system creates records of all types of bids or offers in order to use the offers in the analysis of demand for a property. Through active buyers send out signals to multiple sellers of property of their interest and responses from sellers inform the buyers of market behavior and their own purchasing potential. The market is tested through multiple simultaneous probes of market value. Multiple buyers can simultaneously place offers on multiple properties indicating an interest. Selective feedback to both buyers and sellers informs them of the market values for properties in which they show an interest. When offers appear that are acceptable to a seller, they may intervene and consummate the deal through the conventional offer and acceptance processes used in the particular market of interest. However until such a point is reached the seller may continue to leave the property in the system to test value waiting until demand reaches a point that triggers their interest. Sellers obtain rapid feedback on the demand for their property in the market place of all available properties.

In another embodiment the system generates real time market demand information useful to not just the buyers and sellers but other users who are peripherally attached to the market. These other users may include bankers, brokers, economists and investors. Examples of market information include the number of offers on a property, the size of the offers, the offer increments and the frequency of offers. The real time offer data coupled with other parameters such as logs of deals that move on to the next stages, total number of properties in the system, external factors like interest rates and seasonality all combine to provide insight into a local, regional and global market place heretofore unavailable. In another embodiment the system includes an analysis means to provide multivariate analysis of the results in light of the buyer's buying parameters, the sellers parameters, the current activity on all properties, the property description factors and external factors. In another embodiment the predictive capabilities of the resulting multivariate analysis is used to enable an expert system that advises sellers and buyers on optimum parameters based upon their own particular goals. In another embodiment, an algorithm that takes into account factors that are internal to the local transactional space, property specific factors and external factors, calculates a minimum acceptable offer. In another embodiment the raw data and multivariate analysis is available to third party experts such as bankers, economists and investors. Another embodiment of the invention includes access to the rich market demand information that the system generates. The activity of offers and responses on the collection of properties by multiple sellers and multiple buyers simultaneously interacting generates measures of market demand and activity. The information may be classified variously by geography, pricing, buyer characteristics, property characteristics and external market factors such as seasonality, interest rates, local and global economic factors.

In another embodiment, the system also provides automatic self-checking A registration process tests for legitimate buyers. A similar registration process for sellers that may include representation by qualified professional agents ensures only legitimate sellers and properties. The system is linked to qualified database systems for information feed such as the multiple property listing services. In another embodiment a system administrator polices the buying and selling activity for unusual activity that may degrade the accuracy or quality of the system information. In another embodiment, sellers may police activity upon their properties and disqualify buyers who they believe may be gaming the system and degrading the accuracy of the market information they are receiving. In another embodiment buyers may provide feedback to the system to help remove sellers who may have entered non-existing properties or parameter sets that are degrading the information in the system.

To insure a clear and complete description to enable a person of ordinary skill in the art to practice the invention, specific examples of applying the invention to the real estate market are provided. It should be understood that the invention could apply to various other markets and property systems. Non-limiting examples include: stocks, options, commodities, advertising ads, equities, interest in a product or property. The specific examples are not intended to limit the inventive concept to the example application. Other aspects and advantages of the invention will be apparent from the accompanying drawings and detailed description.

DETAILED DESCRIPTION

Hardware Environment

Figure 1:
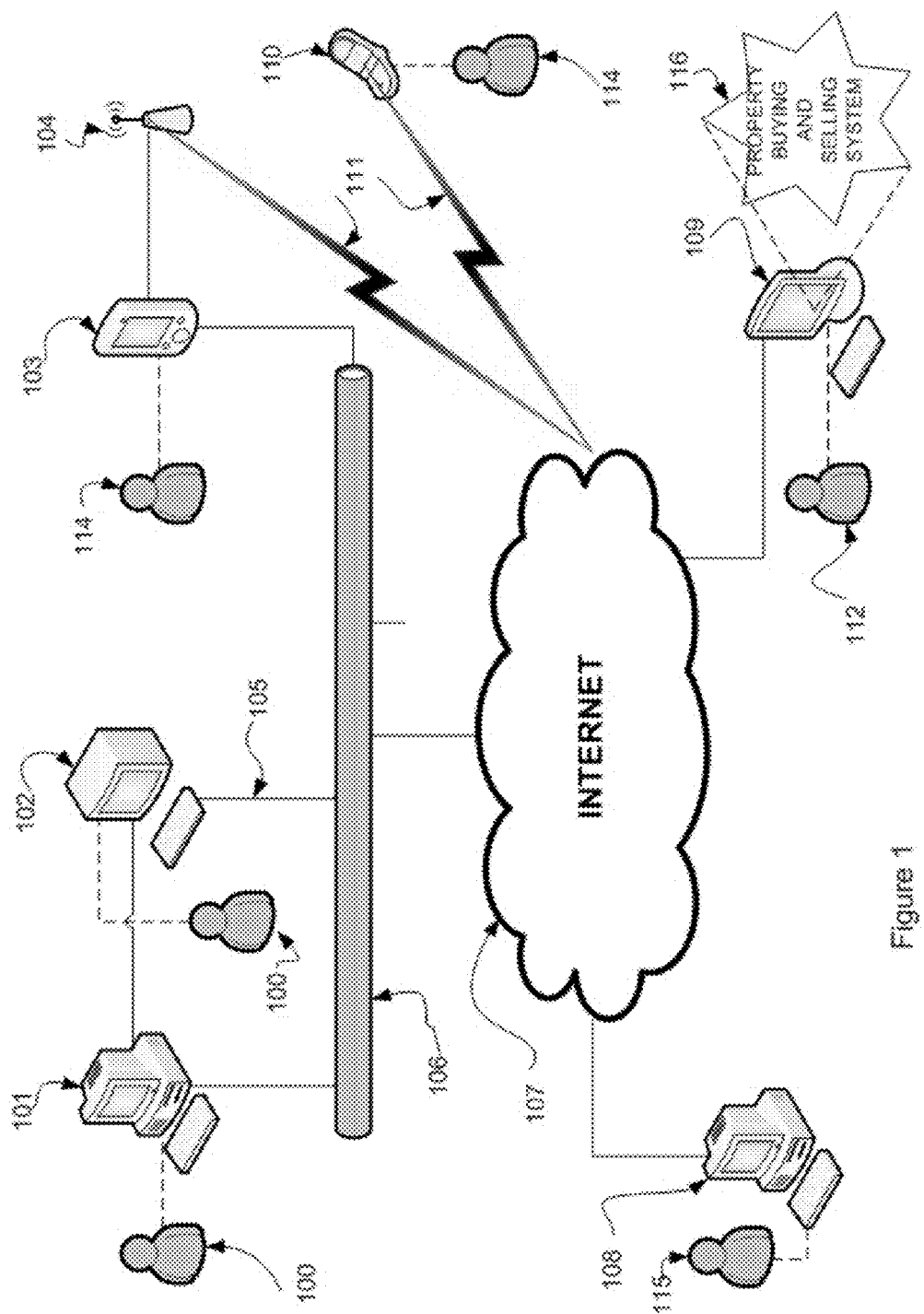
FIG. 1 is a block diagram of a computer network consistent with the invention.

FIG. 1 depicts a networked computer environment consistent with an embodiment of the invention. Multiple users 100, 114, 115 simultaneously connect to the selling system 116 that is operating on a computing system 109 attached to the network of other users through for example the internet 107. Non-limiting exemplary computing means to operate the invention selling system include personal computers 101, data terminals 102, personal digital assistants 103, and cellular telephones 110. The connection between users may be hard-wired 105 or through wireless or cellular connections 111. The users and the selling system may be connected through the internet 107 or through a local network 106. The users 100 of the system may be buyers 100, sellers 114, and/or agents of either. There are additional users 112 who are administrators operating the buying and selling system 116. In another embodiment third party users 115 who benefit from the information generated by the inventive selling system may also connect. Non-limiting examples of the latter users include private and government economists, mortgage investors, government regulators and academics.

Figure 2:
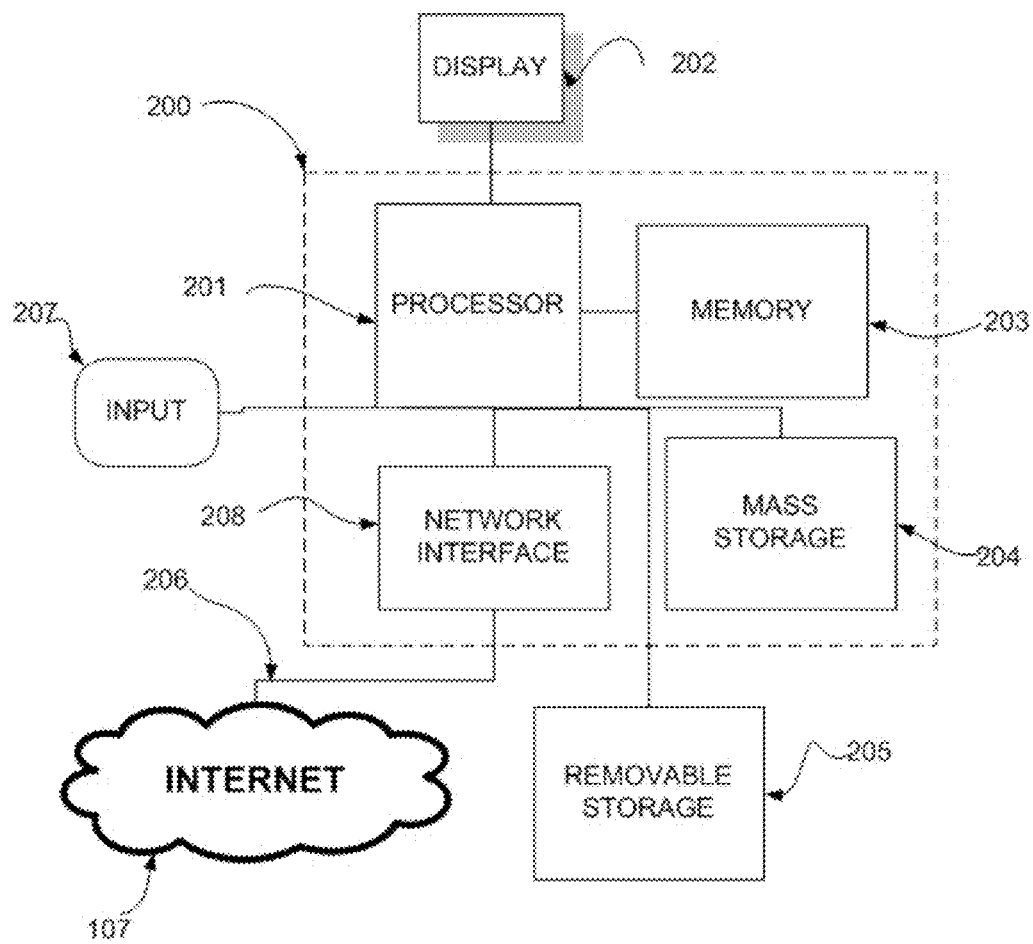
FIG. 2 is a block diagram of exemplary computing environment consistent with the invention and representative of a single computing device of FIG. 1.

FIG. 2 depicts a typical hardware and software environment for one of the computing means of FIG. 1. The computer 200 will include a user input device 207 such as a keypad or keyboard by which variously a seller may post property information, a buyer may input parameters for their interest in properties and offers and other users may query market information. The algorithms of the invention may be encoded in storage medium that may either be fixed memory 203 such as random access memory or read-only memory. The algorithms may also be stored on mass storage medium such as a hard disk drive 204. Similarly removable storage media 205 such as magnetic or optical disks may also contain the encoded algorithms of the invention. Whatever the storage means, it is typically connected to a processor that 201 that is able to receive and execute the encoded commands of the invention and communicate results to a local display 202. Input and output communication may also be effected remotely through for example a network interface 208 and connection 206 to the internet 107. The connection 206 may be, as discussed in FIG. 1 above, both wired and wireless and may be through a local network or wide are network.

Method and Software Framework

Figure 3:
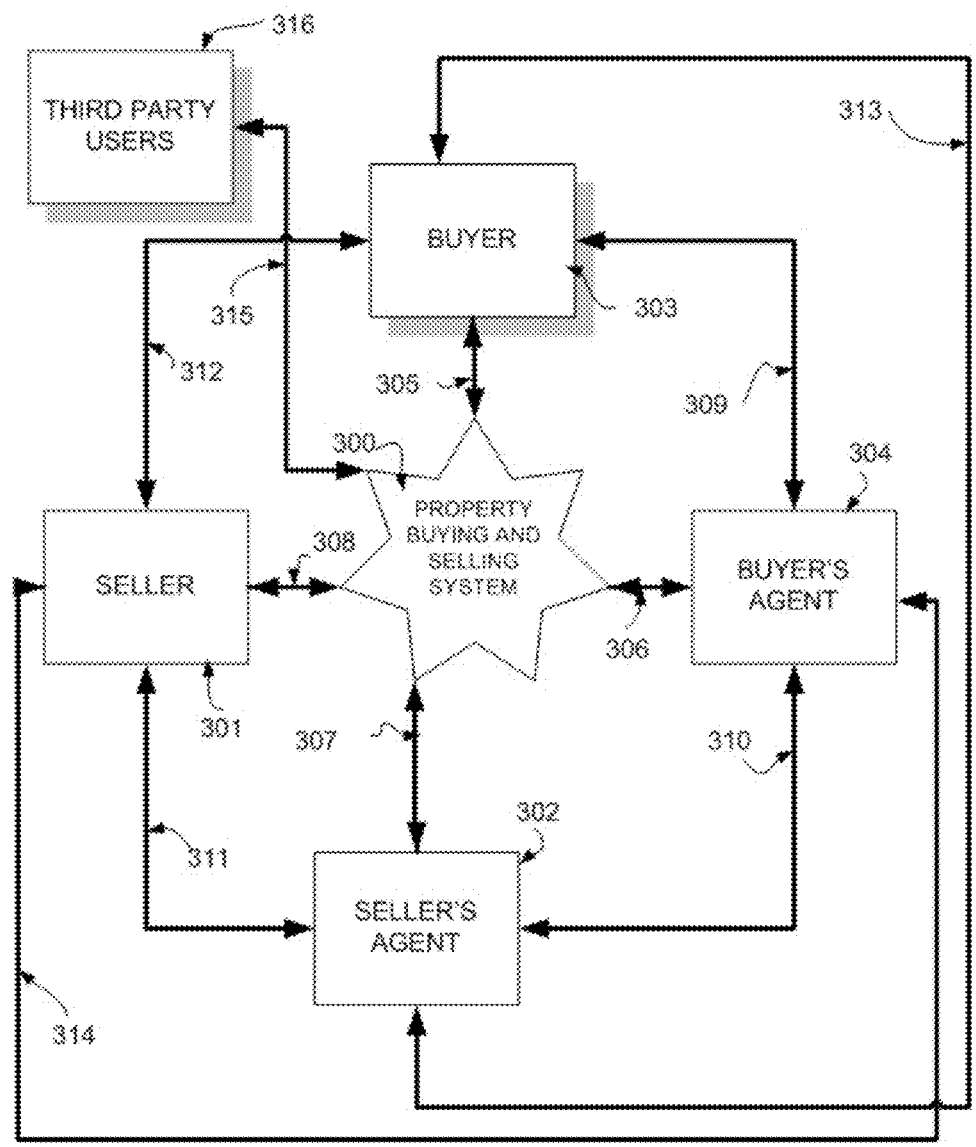
FIG. 3 is a block diagram of the communication pathways in an embodiment of the invention.

FIG. 3 depicts a block diagram of the multiple communication paths in an embodiment of the invention. Buyers 303 may be represented by agents 304 and will communicate with those agents bi-directionally 309. Buyers may also communicate directly 305 with the selling system invention 300. Sellers 301 similarly may be represented by agents 302 and will have communication paths with both their agents 311 and the processes of the selling system invention 308. In one embodiment the buyers interact directly with the selling system invention to find properties place offers and offer parameters and sellers will interact with the selling system to gather offer information regarding their properties and if so motivated intervene to contact buyers directly 312 who they judge from the activity to be genuinely interested in the property and who they judge as buyers with whom a deal may be consummated. In a typical embodiment the sellers will gather offer information and with their agent decide upon which buyers should be contacted and the seller's agent will then contact the buyer's agent 310 to further the deal. In another embodiment, the buyer is not represented by an agent, and the seller's agent may contact the buyer directly 313. There are also other users 316 who are in communication with the system and in a typical embodiment would not be parties to the potential deals and communicate 315 only through the buying and selling system of this invention. These would be users who are gathering information regarding the activities of the buyers and sellers and their agents and using that information to gain insight into the market demand and performance for the properties listed in the system. In another embodiment all buyer and seller communication is mediated by the system. Communication links 310, 312, 313, 314 are removed. Communication links 305, 306, 307, 308, 309, 311 and 315 remain. In another embodiment, all interactions are restricted to be through qualified agents. Communication links 305, 308, 310, 312, 313 and 314 are removed. Communication links 306, 307, 309, 311 and 315 remain. The system controls the active communication links through identification of particular users: buyers, sellers, agents, third parties and administrators and enabling the appropriate link based upon the parameters associated with particular users or user categories and general system design parameters.

Figure 4:
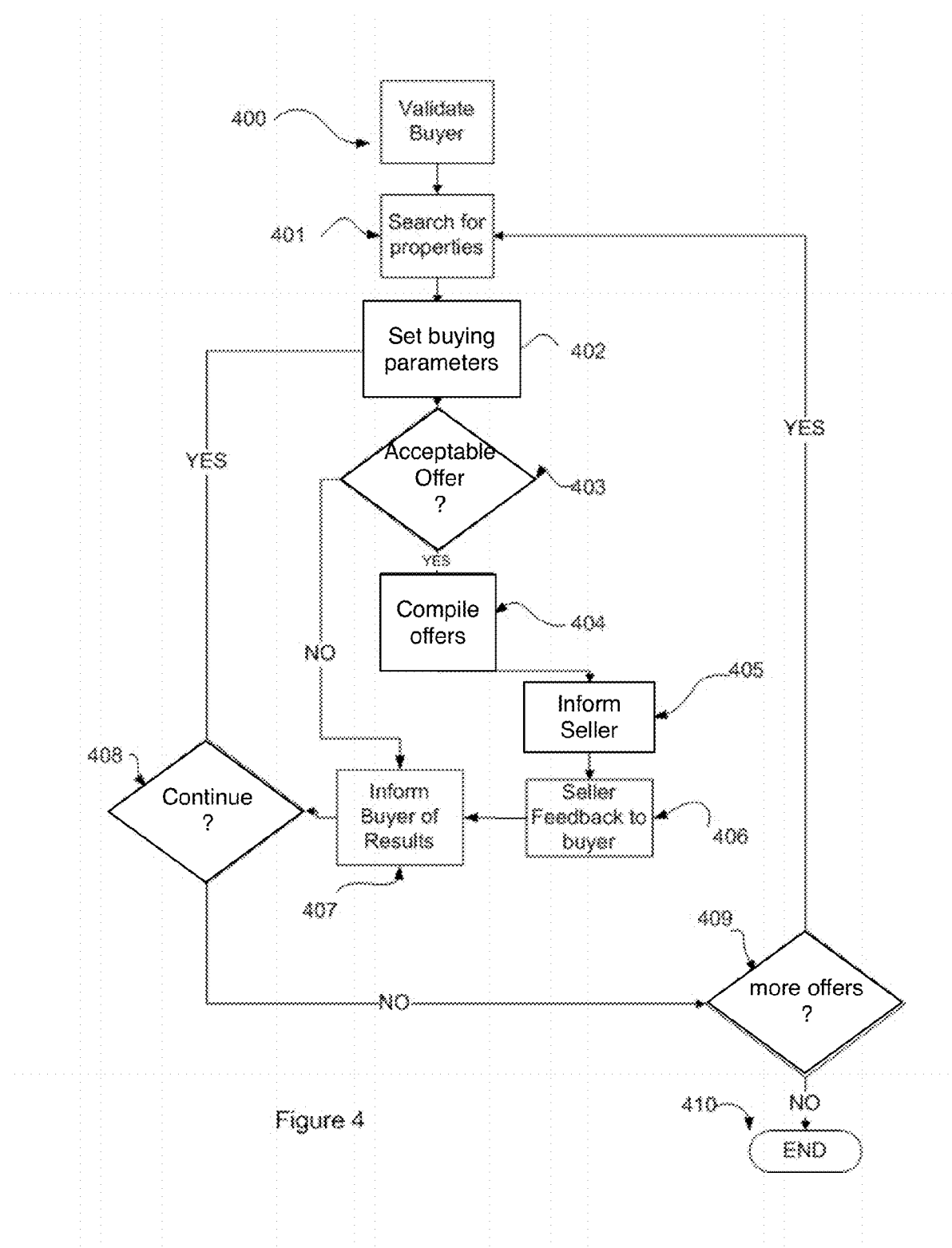
FIG. 4 is a flow diagram from a buyer perspective for an embodiment of the invention.

FIG. 4 is a flow diagram for an embodiment of the invention with emphasis on the buyer's perspective. Multiple instances of the flow diagram will take place simultaneously as multiple users, both sellers and buyers, user the selling system. A buyer or buyer's agent will first enter the system and undergo a validation process 400. In subsequent discussion of FIG. 4 the terms buyer and buyer's agent are interchangeable. The instant invention supports multiple simultaneous properties, buyers and sellers. Therefore terms buyer, seller and property are understood to represent plural forms as well as singular. Validation also uniquely identifies the buyer to the network so that the results of their offers and responses to those offers may be communicated to them. In another embodiment the validation process 400 controls the communications options as discussed for FIG. 3 above. Buyers will then conduct a search 401 for properties that are of interest. Search parameters would typically include a set of property descriptors appropriate for the particular market. Exemplary descriptors that may be searched include property type, price, and geography (for real estate properties). Once a property or set of properties is selected, the buyer then defines a set of parameters 402 under which they would like to make non-binding offers on the properties. Non-limiting exemplary parameters may include starting offer, maximum offer, offer increments if automatic bidding is enabled, whether response offers should in fact be automatic or manual, etc. Each selected property may have a unique set of bidding or buying parameters. Bidding parameters referring to an embodiment where an auction process is used and buying parameters referring more generally to situations involving an auction or other interaction processes, including written offers, verbal offers, etc. Note that setting buying parameters allows unusual control to the "buyer" in that an offer need not necessarily exceed a previous offer. Buyer sets offer increments in an automated "bidding" system where successive offers need not increment over previously made offers of other bidders. The purpose of the system is to gather information related to market demand and not necessarily to find the quickest path to a deal. The offers for all selected properties are then submitted to the selling system and tested for acceptability 403. Offers may be rejected as unacceptable because the offer is lower than an acceptable threshold or perhaps the offer has been excluded by parameters selected by the seller of that property. The latter exclusion would be an exemplary embodiment where the system is self-policing for buyers who are identified either manually by sellers or administrators or automatically as being users who are making frivolous offers. An unacceptable offer will be signaled back to the buyer 407.

The buyer then makes a decision 408 to either continue by setting new buying parameters 402 or to stop the process on a particular or all properties. An acceptable offer then continues the process and offers for all properties from all buyers are compiled 404. Compile offers in the case of the instant invention includes as exemplary steps: to log all offers, offer history and offer parameters in a database, compare and rank offers as to highest offer, relate offers in the buying and selling database to selling parameters, relate offers in the buying and selling system database to the current market data such as date and time, relate offers in the buying and selling database to external factors such as interest rates. A top offer is identified in each case and selected information is passed on to the seller 405. The seller may then provide feedback to the buyer 406. Exemplary feedback includes rejecting the offer, ignoring the offer or contacting the buyer to further consummate a deal. Seller feedback is sent to the buyer 407. The buyer may then continue by deciding 408 to alter the biding parameters 402 or select additional properties (409 then 401) or to end the process 410. This embodiment of the invention uses an auction process to generate information regarding the property for the buyer, the seller, other interested parties and generally information regarding the market for the type of property. In another embodiment the process does not, as in the conventional sense of an auction, definitively define a winning offer and therefore a single buyer for the property. The buying and selling parameters and the results of the activity along with outside market data are used to provide market demand information which is reported to a user. In another embodiment the seller may set parameters such that the auction does define an ultimate buyer for a property. In one embodiment the seller is provided information regarding all acceptable offers and offers including the highest, second place offer and so on. In another embodiment the system also provides other buyer information such as ability to qualify for financing.

The system generates information to the buyer and seller. The buyer can gauge the competition for different properties, the seller's willingness to bargain and the general cost of buying any of the properties. The seller may gauge demand for their property, likely selling price and buyers' willingness to bargain. The output of the auction process is tangible useful information to buyers and sellers regarding which particular transaction, if any, should be pursued further. Although the description and FIG. 4 frequently depicts the process from a single buyer perspective, there may be a plurality of buyers and sellers simultaneously practicing the invention.

Figure 5:
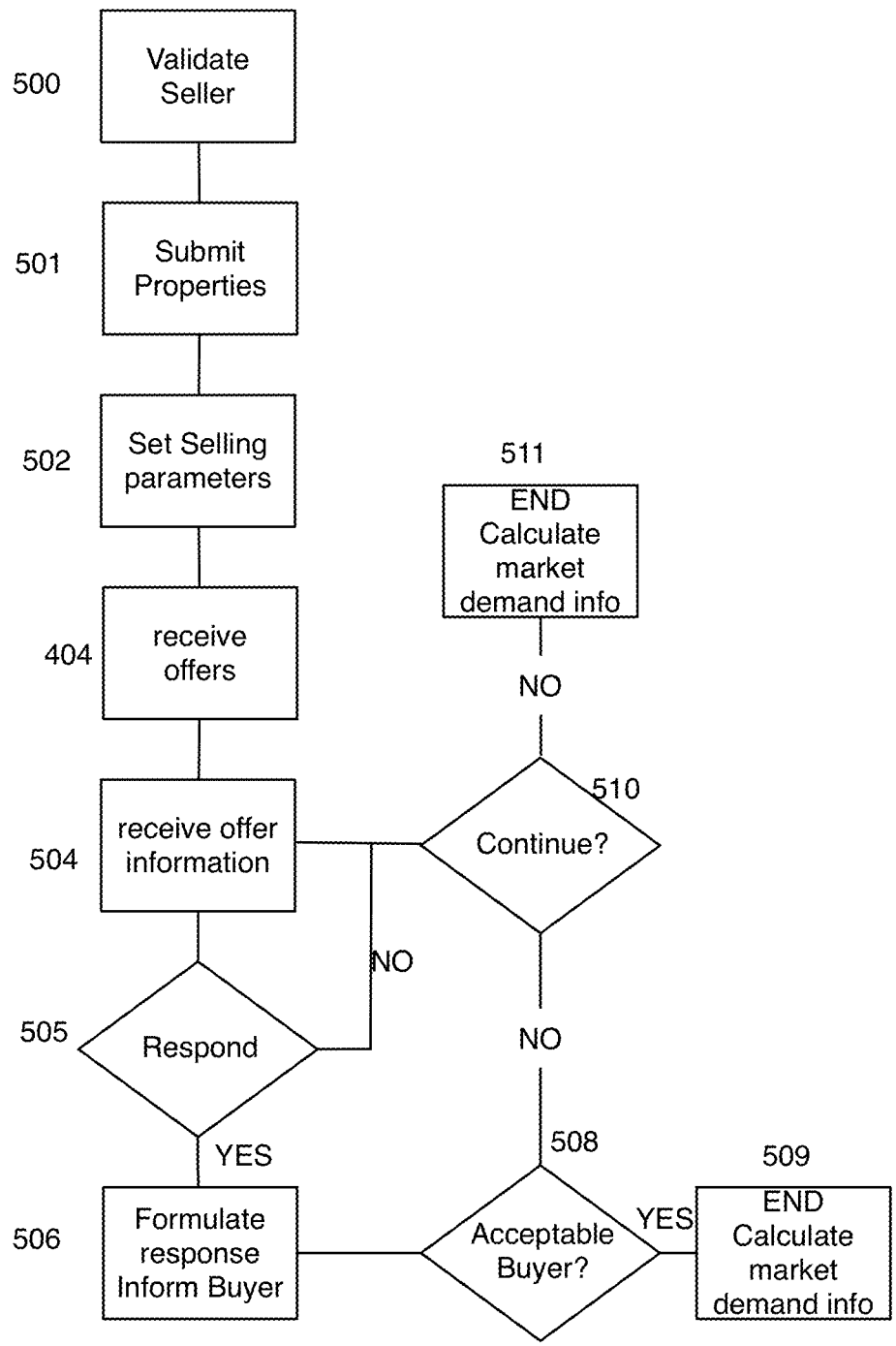
FIG. 5 is a flow diagram from a seller perspective for an embodiment of the invention.

FIG. 5 is a flow diagram depicting an embodiment of the invention from the sellers' perspective. The seller links to the system and is validated 500. In one embodiment the validation includes requiring an agent. In another embodiment the validation implements the communication restraints as discussed in FIG. 3 above. Through the rest of this discussion of FIG. 5 seller may refer to the seller of the property or their agent or both. The process also is described as if a single seller is active. The actual invented system usually involves multiple sellers participating simultaneously. The seller or their agent then submits a property or properties for offer 501. In one embodiment submission includes description of the properties and asking prices. In another embodiment both the validation and the submission may take place through an external multiple listing service. The Seller then sets desired selling parameters 502 for the selling of the property. Non-limiting examples of seller parameters include a minimum acceptable offer, particular buyers from whom the seller will not accept offers and notification procedures for particular bidding activity. The system then conducts the bidding process 404 and reports offer information to the seller 504. The description of what constitutes the bidding process was discussed in conjunction with FIG. 4 above. The seller then decides 505 whether to respond to the offers 506 or simply continue to gather offer and market information 504. Although for clarity of explanation, the process is depicted as serial events in FIG. 4, events in practice are happening in parallel. For example, seller continues to receive offer information 504 while simultaneously formulating a response to offers 506. Non-limiting examples of offer responses include reject all offers, reject offers from a particular buyer, reject this and all future offers from a particular buyer or contact a buyer to test whether they might consummate a deal 508. If a deal is reached and the property is sold the process ends 509. Ending 509 includes estimating market demand information from the selling parameters the buying or offer parameters and the results such as the accepted price and the time and number of process steps to reach that price. If no deal is reached, the seller decides 510 whether to continue in the process and receive additional offer information 504 or not 511. Again End 511 includes estimating market demand information from the selling parameters the buying or offer parameters and the results such as the accepted price and the time and number of process steps executed before the process was stopped. Regardless of whether a deal is reached 509 or not 511, market demand information is estimated and provided to users.

Figure 6:
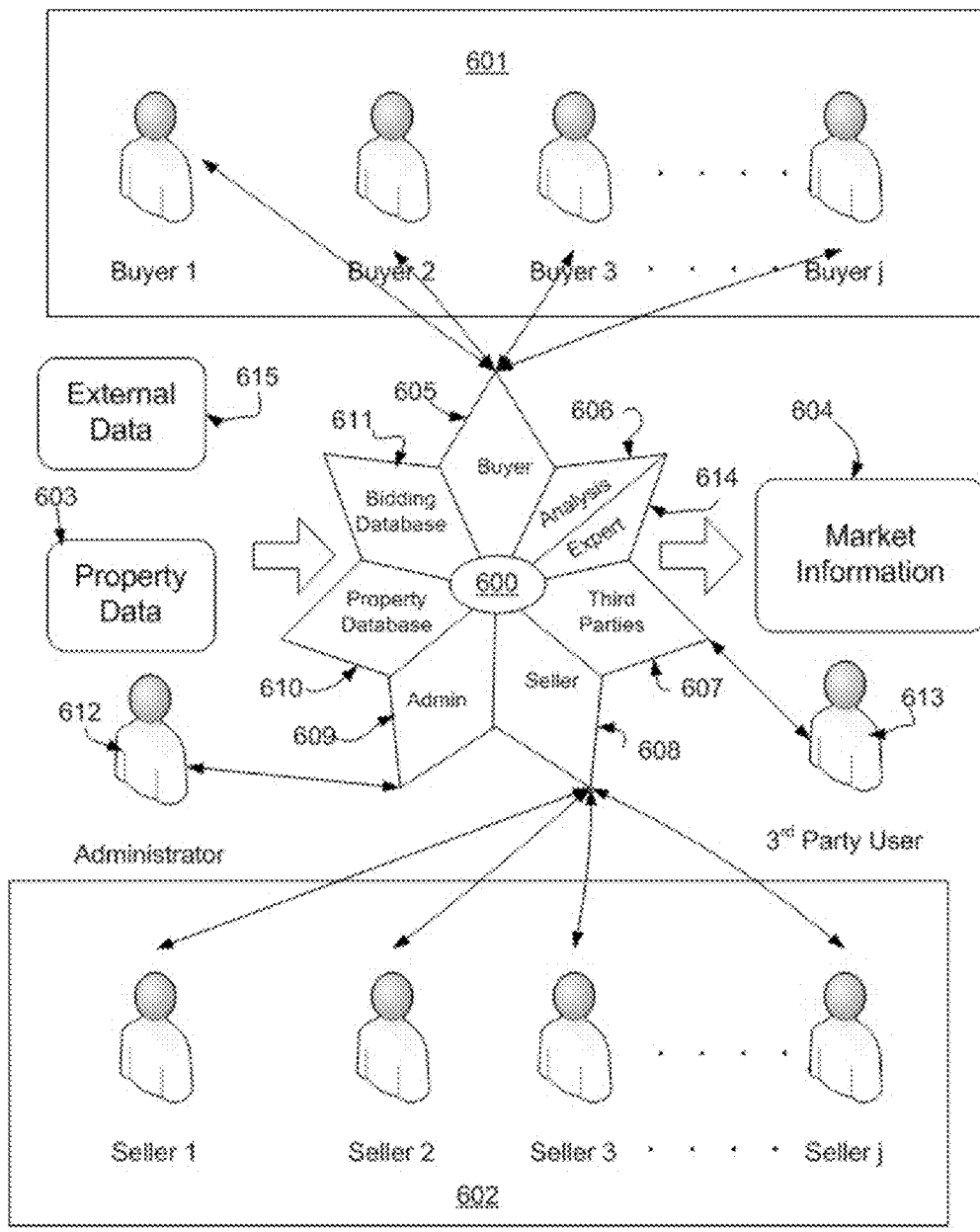
FIG. 6 is a block diagram showing the parallel activities and market information flow for an embodiment of the invention.

FIG. 6 is a block diagram of an embodiment of the invention. The inventive hardware, software and methods that comprise the system 600 includes a buyer interface 605, a seller interface 608, an administrator interface 609, a database 610 of property descriptions a database buying parameters and bidding results 611, an analysis system 606, an expert system 614 and a third party interface 607. In another embodiment the system consists of a buyer interface 605, a seller interface 608, an administrator interface 609, a property database 610 and an analysis system 606. In this latter embodiment the offers are not stored in a bidding database but are analyzed and passed directly to the sellers. In another embodiment the property database 610 is not incorporated into the system but is held externally 603. The buyer interface 605 receives bidding information from the buyers 601 and provides feedback to buyers of bidding results. In another embodiment the buyer interface 605 provides advice from the expert system 614. Non-limiting examples of such advice includes estimates of optimum buying parameters for use under the currently measured market conditions. Non-limiting examples of parameters used to measure current market conditions include the number of offers, the frequency of offers, the size of offers, the number of offers, and the number of properties entering and leaving the system. A Seller interface 608 receives property information from a plurality of sellers 602. In another embodiment the system receives property information from other sources 603. A non-limiting example of another source is a multiple listing service. The seller interface also provides feedback to sellers regarding the progress of the bidding process. Sellers 602 provide property and offer response information to the system and receive individually in return information regarding their particular properties. The system compiles and analyzes the information provided directly by the buyers and sellers, indirectly by their interaction with the system and through external inputs and produces market information 604 that may then be shared with the populations of buyers 601, sellers 602 and interested third parties 613. In another embodiment the system receives external data relevant to the market 615. Non-limiting examples of such information include interest rates. In another embodiment the system 600 integrates the external data 615, the property data 603 the bidding information and the seller response into the property and bidding databases and the analysis 606 includes multivariate analysis that may be used by the expert system 614 to provide predictive expert advice to buyers and sellers regarding their respective bidding and response parameters.

Figure 7:
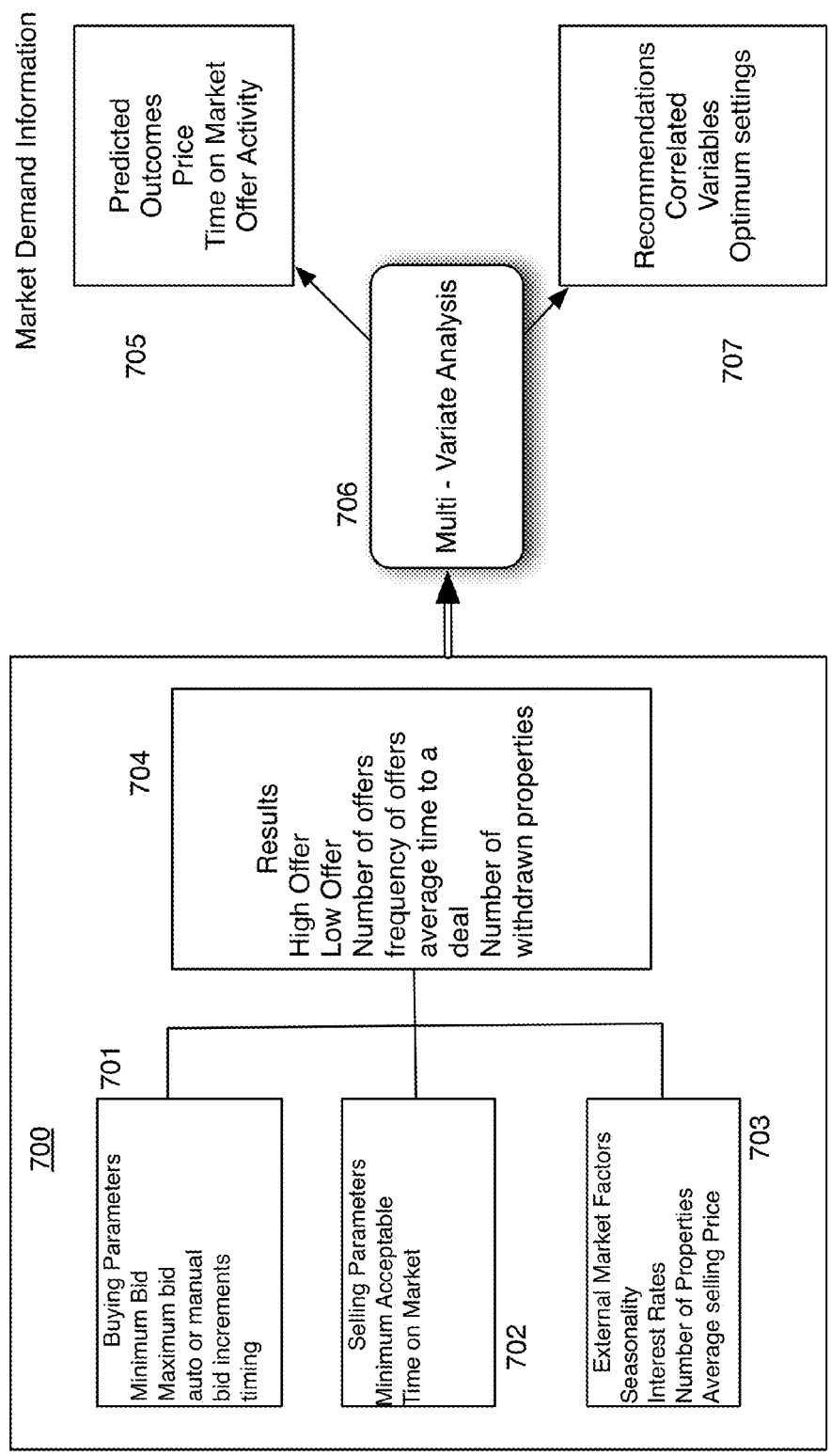
FIG. 7 is a block diagram for the expert advisor of an embodiment of the invention.

FIG. 7 is a block diagram for another embodiment of the invention. Data from exercising the process 700 is comprised of the offer or buying parameters 701, the seller parameters 702, external parameters 703 and the results 704. Each of these categories is comprised of multiple individual variables, non-limiting examples of which are included in the diagram. Non-limiting examples of users of the invention include sellers, buyers, their agents, the system administrator and other interested parties such as investors and realtors if the property is real estate property. Each user may have particular questions or interest in particular predicted outcomes 705 for a buying/selling process prior to the actual bidding takes place. Such outcomes may comprise a seller who wants a maximum price or a short time to sell or the optimum minimum asking price or a buyer who wants the minimum price or a third party who might be interested in all of these as a function of either a controlled or external parameter. In another embodiment, the invention uses a multi-variable analysis procedure 706 to find those variables amongst the historic data 700 that mostly strongly influence the predicted outcomes 705 and produces a predictive equation of results. The predictive equations are used to inform an expert system 707 of recommendations to be provided to users. Such recommendation is comprised of the input variables 701, 702, 703 that most strongly affect the desired outcome parameter and the optimum settings for those input variables. In another embodiment a seller places a property for sale. The seller typically has a price range that they would find acceptable. However this price range might not include that minimum starting price or offer that would produce optimum results in a dynamic property buying and selling system. The seller might be most interested in a maximum price for the property but also might be just as interested in a short time on the market. The expert system advises the seller of an optimum starting price to use in their seller input parameters to obtain their desired outcome for properties of the type they are selling. In another embodiment the decision to provide the user with expert advice is controlled by the system administrator and offered selectively to particular users as identified through their registration process.

CONCLUSIONS

A dynamic property buying and selling system is described. The system is comprised of networked hardware, software, processes and methods that enable an auction like system to probe the market and inform buyers, sellers and interested third parties of current market demand information including dynamics. The described system may be used in real estate and other markets to complete early stages of a negotiation process as well as enable buyers and sellers to test for market demand information. Third party observers may use the system to investigate and report on market demand information and test economic theories regarding the market of interest. An integrated expert system is useful to buyers, sellers and third party observers in providing answers to queries regarding correlation of auction parameters and optimization of parameters for particular desired outcomes. Controls are integrated into the system to help ensure accuracy of the results and information by blocking observed detrimental activity.

I claim:

1. A method of determining market demand information for buying and selling properties comprising:
   a. inputting external market factor information,
   b. inputting property data for a plurality of properties,
   c. inputting selling parameters,
   d. inputting buying parameters,
   e. receiving offers on said properties based upon said selling parameters and said buying parameters, and,
   f. determining market demand information from the received offers, said market demand information including future buying and selling parameters from multivariate analysis having input variables and outcomes wherein the input variables are the inputted external market factor information, inputted selling parameters and inputted buying parameters and the outcomes include a high offer, a low offer, number of offers, frequency of offers and average time to a deal,
   g. providing the determined market demand information to a user
   h. wherein the steps of the method are performed by a networked computer system.

2. The method of claim 1 wherein the said buying parameters include at least one selected from: starting offer, maximum offer, and offer increments.

3. The method of claim 2 wherein the receiving offers is in an auction and offers are bids in the auction.

4. The method of claim 1 wherein the property is real estate.

5. The method of claim 4 wherein the external market factor information includes at least one selected from: loan interest rates and number of properties on the market.

6. The method of claim 1 where the property is advertising.

7. A system for determining market demand information for buying and selling properties comprising:
   a plurality of networked computing devices, said computing devices programmed to allow a user to:
   a. input external market factor information,
   b. input property data for a plurality of properties,
   c. input selling parameters,
   d. input buying parameters,
   e. receive offers on said properties based upon said selling parameters and said buying parameters, and,
   wherein said computing devices are programmed to determine market demand information said market demand information including future buying and selling parameters using multi-variable analysis having input variables and outcomes, wherein the input variables are the inputted external market factor information, inputted selling parameters and inputted buying parameters and the outcomes include a high offer, low offer, number of offers, frequency of offers and average time to a deal and said computing devices are programmed to provide the determined market demand information to said user.

8. The system of claim 7 wherein the said buying parameters include at least one selected from: starting offer, maximum offer, and offer increments.

9. The system of claim 8 wherein the receiving offers is in an auction and offers are bids in the auction.

10. The system of claim 7 wherein the property is real estate.

11. The system of claim 10 wherein the external market factor information includes at least one selected from: loan interest rates and number of properties on the market.

12. The system of claim 7 where the property is advertising.

* * * * *